(12) United States Patent
Galloway

(10) Patent No.: US 7,132,183 B2
(45) Date of Patent: *Nov. 7, 2006

(54) PROCESS AND SYSTEM FOR CONVERTING CARBONACEOUS FEEDSTOCKS INTO ENERGY WITHOUT GREENHOUSE GAS EMISSIONS

(75) Inventor: Terry R. Galloway, Berkeley, CA (US)

(73) Assignee: Intellergy Corporation, Berkeley, CA (US)

( * ) Notice: Subject to any disclaimer, the term of this patent is extended or adjusted under 35 U.S.C. 154(b) by 589 days.

This patent is subject to a terminal disclaimer.

(21) Appl. No.: 10/602,536

(22) Filed: Jun. 23, 2003

(65) Prior Publication Data

US 2004/0058207 A1   Mar. 25, 2004

Related U.S. Application Data

(63) Continuation-in-part of application No. 10/184,264, filed on Jun. 27, 2002, now abandoned.

(51) Int. Cl.
*H01M 8/06* (2006.01)

(52) U.S. Cl. .......................................... 429/17; 429/20

(58) Field of Classification Search ................. 429/17, 429/19, 20; 588/313, 321, 435; 422/200
See application file for complete search history.

(56) References Cited

U.S. PATENT DOCUMENTS

| | | | |
|---|---|---|---|
| 4,473,622 A | 9/1984 | Chludzinski et al. | 429/19 |
| 4,874,587 A | 10/1989 | Galloway | 422/189 |
| 4,909,808 A * | 3/1990 | Voecks | 422/200 X |
| 5,068,159 A | 11/1991 | Kinoshita | 429/17 X |
| 5,248,566 A | 9/1993 | Kumar et al. | 429/19 |
| 5,616,430 A | 4/1997 | Aoyama et al. | 429/17 |
| 5,866,090 A | 2/1999 | Nakagawa | 429/17 |
| 5,985,474 A | 11/1999 | Chen et al. | 429/17 |
| 6,187,465 B1 | 2/2001 | Galloway | 429/17 |
| 2003/0175561 A1 | 9/2003 | Lightner | |

FOREIGN PATENT DOCUMENTS

JP          60-177571          9/1985

OTHER PUBLICATIONS

Aresta et al., "Carbon Dioxide: A Substitute for Phosgene", Chem Tech. pp. 32-40, Mar., 1997.
Hileman, "Industry Condsiders CO2 Reduction Methods", Chem & Engr News, p. 30, Jun. 1997.

(Continued)

*Primary Examiner*—Stephen J. Kalafut
(74) *Attorney, Agent, or Firm*—Nixon Peabody LLP

(57) ABSTRACT

The process and system of the invention converts carbonaceous feedstock such as coal, hydrocarbon oil, natural gas, petroleum coke, oil shale, carbonaceous-containing waste oil, carbonaceous-containing medical waste, carbonaceous-containing hazardous waste, carbonaceous-containing medical waste, and mixtures thereof into electrical energy without the production of unwanted greenhouse emissions. The process and system uses a combination of a gasifier, e.g., a kiln, operating in the exit range of at least 700° to about 1600° C. (1300–2900° F.) to convert the carbonaceous feedstock and a greenhouse gas stream into a synthesis gas comprising mostly carbon monoxide and hydrogen without the need for expensive catalysts and or high pressure operations. One portion of the synthesis gas from the gasifier becomes electrochemically oxidized in an electricity-producing fuel cell into an exit gas comprising carbon dioxide and water. The latter is recycled back to the gasifier after a portion of water is condensed out. The second portion of the synthesis gas from the gasifier is converted into useful hydrocarbon products.

27 Claims, 12 Drawing Sheets

OTHER PUBLICATIONS

Caruana, "Fuel Cells Poised to Provide Power", Chem. Eng. Prog., pp. 11-21, Sep., 1996.

Eilers et al., "The Shell Middle Distilate Synthesis Process (SMDS)", J.C. Batlzer A.G., Scientific Publishing Company, Catalysis Letters 7, pp. 253-269, 1990. (Month unknown).

"The Shell Middle Distilate Synthesis Process (SMDS)", J. Eilers, S.A. Posthuma, AIChe Spring National Meeting, Mar. 18-22, 1990.

"Advances in Tubular Solid Oxide Fuel Cell Technology", S.C. Singhal, Westinghouse Electric Corporation, 1995 (Month unknown).

"A New Concept for a Lower Cost Coal to Methanol Plant", T.R. Galloway, W.T. Atkins, G.E. Pack, M.B. Psacoo, Advanced Energy Conversion Division, Mittelhauser Corp.-17th IECEC.

"Conversion of Natural Gas to Transportation Fuels Via the Shell Middle Distillate Synthesis Process", (SMDS), V.M.H. Van Wechem, Shell International Petroleum & M.G. G. Senden, Koninklijke/Shell. 1994 (month unknown).

"Texaco Gasification Process", Terry R. Galloway, SEG-California. (Date Unknown).

* cited by examiner

PROCESS AND SYSTEM FOR CONVERTING CARBONACEOUS FEEDSTOCKS INTO ENERGY WITHOUT GREENHOUSE GAS EMISSIONS

This application is a continuation-in-part of application U.S. Ser. No. 10/184,264 filed Jun. 27, 2002; now abandoned now published as Publication No. 2003/0022035 on Jan. 30, 2003. This application is related to and contains common subject matter with U.S. Ser. No. 09/186,766 filed Nov. 5, 1998; now U.S. Pat. No. 6,187,465 issued Feb. 13, 2001 (the '465 patent), which claims the benefit of U.S. provisional application Ser. No. 60/064,692 filed Nov. 7, 1997. This application is not a continuation-in-part of the latter application, U.S. Ser. No. 09/186,766, as stated in the parent application, U.S. Ser. No. 10/184,264.

This invention relates to non-greenhouse gas emitting processes and systems which accomplish the conversion of a carbonaceous gas stream and a greenhouse gas into a synthesis gas comprising hydrogen and carbon monoxide without the need for expensive catalysts and or high pressure operations.

BACKGROUND OF THE INVENTION

The burning of fossil fuels in boilers to raise high temperature, high-pressure steam that can be used to power turbo-electric generators produces a problem source of carbon dioxide and other greenhouse gases, e.g. methane, ozone and fluorocarbons. This fossil fuel combustion, especially of coal, needs a technological fix to avoid the emission of carbon dioxide and other greenhouse gases with their attendant undesirable release to the earth's atmosphere resulting in the absorption of solar radiation known as the greenhouse effect. Much of the world depends on coal for power. There have been significant efforts to develop clean coal technologies to greatly reduce the release of acid gases, such as sulfur oxides and nitrogen oxides. However, to date none of these clean coal programs aim to eliminate the emissions of carbon dioxide and other greenhouse gases. Efforts to use pure oxygen in power plants and gasification systems to avoid the diluting effects of nitrogen and to achieve higher efficiency suffers from the unacceptable cost of requiring an air separation plant and the problems of excessive temperatures in oxygen-fed combustion turbo-generators.

There is also widespread effort to increase the efficiency of power plants by utilizing advanced thermodynamic combined cycles, more efficient turbo-generators, improved condensers and cooling towers, and similar systems. A small portion of this effort involves the use of fossil fuel gasification processes, which are highly efficient because they avoid combustion and large combustion product emissions. Finally there is an effort by Westinghouse (Corporate literature, "SureCell®" 1996) and others to combine the use of advanced high temperature turbo-generators and fuel cells to accomplish conversion to electricity at about 70% instead of current conventional combined cycle power plants of about 47%.

Today there is worldwide concern that the atmospheric buildup of carbon dioxide and other greenhouse gases will start to have serious environmental consequences for the earth's tropospheric temperature, global rainfall distribution, water balance, severe weather storms, and similar consequences. Technological solutions are being demanded throughout the world.

The worldwide research establishment, encouraged by government funding from various agencies, continues to be focused on identifying commercially attractive gas separation technologies to remove carbon dioxide from stack gases and also attractive chemistry that will utilize this carbon dioxide as a raw material to manufacture useful products. This has, indeed, been a very large challenge with poor successes as summarized by the review papers; see Michele Aresta, and Eugenio Quaranta, "Carbon Dioxide: A Substitute for Phosgene," Chem. Tech. pp. 32–40, March 1997. and Bette Hileman, "Industry Considers $CO_2$ Reduction Methods", Chem & Engr. News, pg. 30, Jun. 30, 1997. Trying to scrub the $CO_2$ from stack gases and trying to chemically react the recovered $CO_2$ clearly is not the right path of research because of the technical difficulty and the process expense of reacting carbon dioxide.

SUMMARY OF THE INVENTION

The process and system of the invention converts carbonaceous feedstock from fossil fuels and other combustible materials into energy without the production of unwanted greenhouse emissions. The present process comprises the following steps:

(a) converting a carbonaceous feedstock and a greenhouse gas stream in a gasification unit to synthesis gas comprising mainly carbon monoxide and hydrogen, where the gasification unit is a non-catalytic high temperature, gas-phase reactor operating at conditions to achieve a gas exit temperature of from at least 700° to about 1600° C. (1300–2900° F.);

(b) electrochemically oxidizing at least a portion of the synthesis gas from the gasification unit in a first half-cell of a fuel cell to produce a first half-cell exit gas comprising carbon dioxide and water;

(c) recovering the carbon dioxide from the first half-cell exit gas to serve as a greenhouse gas stream in step (a); and (d) electrochemically reducing an oxygen-containing gas in a second half-cell of the fuel cell completing the circuit and resulting in the production of electrical energy.

In contrast to the present invention, the invention disclosed and claimed in the '465 patent preferably used a gasification unit containing a catalyst that operates at a temperature in the range of about 400° to about 700° C. (750–1300° F.) and still more preferably, a gasification unit using a fluidized catalytic bed. The requirement for the use of a catalytic bed requires expensive catalysts and/or high-pressure operations. The catalysts, e.g., nickel or copper-based ceramic supported catalyst typically used in steam reforming of methane or shift converters are easily poisoned by halogens or heavy metals found in waste streams that are a desirable candidate for waste-to-energy-systems. Although catalysts allow for significant reductions in the gas-phase temperature to carry out the synthesis gas formation chemistry, these catalysts only function as long as they remain active and not poisoned by low level contaminates found in the waste feedstocks.

The present system comprises the following:

(a) the gasification unit that is a non-catalytic high temperature, gas-phase reactor operating at conditions to achieve a gas exit temperature of from at least 700° to about 1600° C. (1300 to 2900° F.), for converting a carbonaceous and a greenhouse gas stream feedstock into the synthesis gas;

(b) the fuel cell for the production of electrical energy comprising the first half-cell having an inlet in fluid communication with the synthesis gas and a first means or anode for electrochemically oxidizing synthesis gas into the first, half-cell exit gas, a second half-cell having a second means or cathode for electrochemically reducing the oxygen-containing gas, and a membrane separating the first and second half cells that will not allow passage of the gaseous components from the respective half-cells; and (c) passage means for passing the carbon dioxide from the first half-cell to serve as a greenhouse gas stream for the gasification unit.

Preferably the non-catalytic, gas-phase reactor is a kiln having an inlet means, a gas outlet means, and a solids outlet between the inlet means and the gas outlet means and operating at a temperature gradient along the length of the kiln of about 200° to about 1600° C. (400–2900° F.).

The present process avoids the difficult path of attempting to strip and capture the carbon dioxide from stack gases and without attempting to carry out separate chemical reactions of carbon dioxide to attempt to produce useful products. The process and system of the present invention uses unique gasification technology combined with fuel cells to generate electricity at high efficiency. This is accomplished by taking advantage of a very unique property of fuel cells—namely, the two anodic and cathodic reactions are separated by an electronically conducting membrane that keeps the product gases separate. In this way, a combustible feed gas can be fully oxidized in the first half-cell of the fuel cell without being commingled wit the final products of the air reduction in the second half-cell electrode, i.e., $N_2$. For example, in coal gasification, synthesis gas is formed consisting predominantly of hydrogen and carbon monoxide. This synthesis gas is fed into the first half-cell, i.e., the anode or negative terminal side, of the fuel cell, such as the solid oxide or molten carbonate types, where it is oxidized to water and carbon dioxide. These gases are not diluted by the typical nitrogen remaining after oxygen reduction in the second or remaining half-cell, i.e., the cathode side or positive tenninal, of the fuel side. Nitrogen and combustion gases are commingled when combustion air is used in boilers or furnaces. Thus, in the fuel cell, the synthesis gas (syngas) is oxidized without being comnbusted with air and without being diluted by other gases. The fuel cell-produced water and carbon dioxide are simply separated from each other by condensing the liquid water and allowing carbon dioxide to return to the gasifier. The carbon dioxide being injected into the high temperature gasifier undergoes a reaction with the high temperature carbonaceous feed to form more carbon monoxide, repeating the cycle.

By means of the present process and system, the carbon dioxide in the fuel cell is easily kept separate from the air side and any nitrogen. This carbon dioxide can be recycled back to the gasifler in nearly pure form. Likewise steam in pure form can be recycled as well in different amounts under gasifier control system requirements to maintain the ideal hydrogen to carbon monoxide ratio in the range of about 1.2 to about 1.75. This steam helps maintain a high hydrogen content in the gasifier so that a portion of the gasifler-produced syngas car be used downstream in a chemical reactor such as a Fischer-Tropsch reaction system for the production of a variety of useful chemicals ranging from methanol to paraffin waxes. These in turn are used to make useful chemicals such as naplitha, gas oil, and kerosine, or agricultural chemicals or carbide abrasives. The latter are not over burned in their lifecycle, and they sequester the carbon forever. Thus, the carbon monoxide is used to produce useful chemicals instead of discarding the valuable carbon source in the carbon dioxide. The carbon balance of the plant is maintained such that the mass of carbon input in the waste feed is equal to the carbon mass leaving the plant as valuable hydrocarbon products; not carbon dioxide.

What has been achieved is a chemical plant merged with a power plant that produces useful hydrocarbon products, high efficiency electric power without substantially any carbon dioxide or other greenhouse gas emissions. And, most importantly gasification is much more flexible than a refinery or a coal boiler, since a wide variety of waste streams can be used as the feed material. Thus, this solves two serious problems.

The process of the present invention is designed for use in an electric power producing plant using carbonaceous feedstocks such as coal, hydrocarbon oil, natural gas, petroleum coke, oil shale, carbonaceous-containing waste oil, carbonaceous-containing medical waste, carbonaceous-containing hazardous waste, other carbonaceous-containing waste, and mixtures thereof.

BRIEF DESCRIPTION OF THE DRAWINGS

Advantages of the present invention will become apparent to those skilled in the art from the following description and accompanying drawings in which.

DETAILED DESCRIPTION OF THE INVENTION

Preferred Embodiment of Process for Hydrogen Fuel Cell Energy Without Production of Unwanted Greenhouse Gases Using a Kiln.

Figure 1:
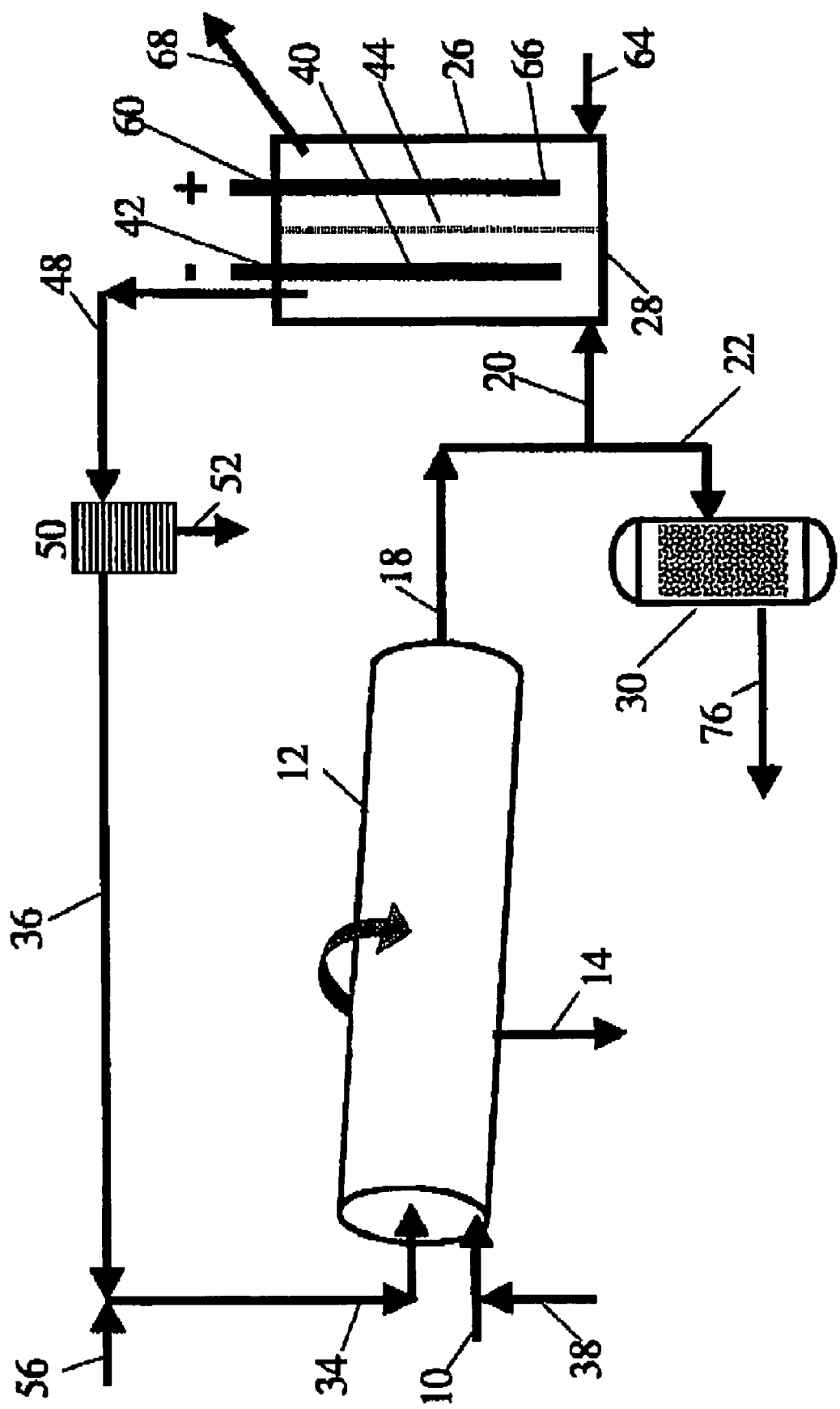
FIG. 1 is a schematic process flow diagram of a preferred embodiment of the process and system of the present invention.

FIG. 1 illustrates a specific embodiment of the process and system of the present invention in which a carbonaceous waste feed material is passed via inlet line 10 to a non-catalytic high temperature, gas-phase reactor 12 and is converted into synthesis gas at high temperature in the range of about 700° to about 1600° C. (1300–2900° F.). Preferably, a rotary kiln is used as gasifier 12 having outlet 14 to remove the buildup of solids. The syngas produced in gasifier 12 that leaves through outlet line 18 is then split downstream into two flow lines 20 and 22. The syngas in flow line 20 enters fuel cell 26 at port 28. The second syngas stream is passed via flow line 22 to Fischer-Tropsch catalytic reactor 30.

Preferably gasifier 12 is a slightly inclined horizontal rotary kiln that is heated externally and is called an "indirectly heated rotary kiln." The slight inclination encourages the feedstock to move axially along the rotary kiln away from the inlet as it is rotated slowly. The carbonaceous feedstock or waste at or near room temperature is introduced into one end of the kiln where the temperature is at about 200° C. and it is subjected to increasing temperatures as it moves along the length of the kiln toward the gas exit end. Preferably the temperature of the gas leaving the exit end is in the range of about 1100° to 1600° C. (1650–2900° F.). Preferably this can be done by pulling the exit gases through a superheater of the typo shown in FIG. 11., which can be located in the region adjacent the exit end of the kiln shown in FIG. 12. The higher temperatures and added steam are needed to accomplish the high levels of destruction required by U.S. EPA law should there be hazardous waste contaminant in a waste feedstock. For recovery of metals and glass for possible recycling, these solids are removed from the kiln before toy are melted. Preferably, these solids arc removed from the rotary kiln at solids exit 14, which is at an appropriate location along the length of kiln where it is estimated that waste feed has reached a temperature of about 400° C. (750°) and before the solids have melted.

Examples of indirectly heated rotary kilns that are suitable for the present invention are manufactured by: Von Roll Inc., 302 Research Drive, Suite 130, Norcross, Ga. 30092; Surface Combustion, Inc., 1700 Indian Wood, Cir., Maunee, Ohio 43537; and Bethlehem Steel of International Steel Group Inc., 3250 Interstate Drive—2nd Floor, Richfield, Ohio 44286.

In fuel cell 26, the syngas feed passes upward through the electrolyte 40 around and through the porous catalytic anode electrode 42 wherein the gases are oxidized electrochemically. Membrane 44 is ionically conducting, but will not allow any of the gases or hydrocarbon species on either side of fuel cell 26 to pass through.

Examples of fuel cells that can accept syngas and are suitable for fuel cell 26 of the present invention include the Solid Oxide Fuel Cell manufactured by Westinghouse, Monroeville, Pa. or by Technical Management Inc., Cleveland, Ohio and the Molten Carbonate Fuel Cell manufactured by FuelCell Energy Corp., Danbury, Conn. The pertinent portion of the following references are incorporated by reference into this Detailed Description of the Invention: C. M. Caruana, "Fuel Cells Poised to Provide Power," Chem. Eng. Progr., pp. 11–21, Sep., 1996 and S. C. Singhal, "Advanced in Tubular Solid Oxide Fuel Cell Technology," Proceedings of the 4th International Symposium on Solid Oxide Fuel Cells, Pennington, N.J., Vol. 95-1, pp. 195–207 (1995).

The oxidized syngas (consisting essentially of hydrogen and carbon monoxide) leaves anode 42 of fuel cell 26 mostly as water vapor and carbon dioxide. This stream of oxidized syngas passes via line 48 into air-cooled condenser 50, where the water vapor is condensed into liquid water and is removed from the condenser bottoms via line 52 for reuse. Wastewater recovered from a municipal sewage system can be used in gasifier 12. However, all or a portion of the relatively pure water in line 52 can be sold or recycled and combined with the wastewater passing into gasifier 12 via line 38. The carbon dioxide gas is not condensed in condenser 50 and passes through into the condenser overhead as carbon dioxide gas to be fed back to the gasifier 12 via line 36. The carbon dioxide in high temperature gasifier 12 reacts therein with the carbonaceous feed material to form more syngas to further assist in the overall reaction. $CO_2$ or other greenhouse gases can be passed into gasifier 12 via line 56 and line 34 to maintain the desired H/C ratio of the feedstock.

To complete the description of FIG. 1, it is noted that the other half-cell of fuel cell 26 involves air reduction on cathode 60. This standard air electrode allows the entering oxygen-containing gas in line 64, typically air, to pass upward through the air electrolyte 66 around and through electrode 60. The inert components of the air stream, consisting mostly of nitrogen, pass through the cathode half-cell and are removed via exit stream 68. Although more expensive, the cathode half-cell can also use pure oxygen instead of air to achieve higher efficiencies and more heat production. The fuel cell produces substantial electrical power ranging from 4 to 9 kilowatts per standard cubic foot per minute of hydrogen feed.

In the Fischer-Tropsch catalytic reactor 30, the syngas in line 22 is reacted over a catalyst 70 to form higher boiling hydrocarbons, such as waxes or other useful hydrocarbon products recovered in line 76. These waxes, for example, can form a feedstock to a Shell Middle Distiliates Synthesis Process where they are reacted to form naphtha, fuel gas, and kerosine, which are all valuable chemical products; see J. Eilers, S. A. Postuma, and S. T. Sie, "The Shell Middle Distillate Synthesis Process (SMDS)," Catalysis Letter 7, pp. 253–270 (1990). The pertinent portions of this paper are incorporated by reference into this Detailed Description of The Invention.

Thus, overall the carbon mass entering the feed via line 10 leaves as carbon mass in the form of useful hydrocarbon products, which are recovered, via line 76, thus avoiding the release of carbon dioxide when a hydrocarbon feedstock is gasified. There is no expensive and troublesome alkali stripper to recover carbon dioxide from stack gases, as would be the case in a normal combustion/steam-turbine power plant configuration.

Figure 2:
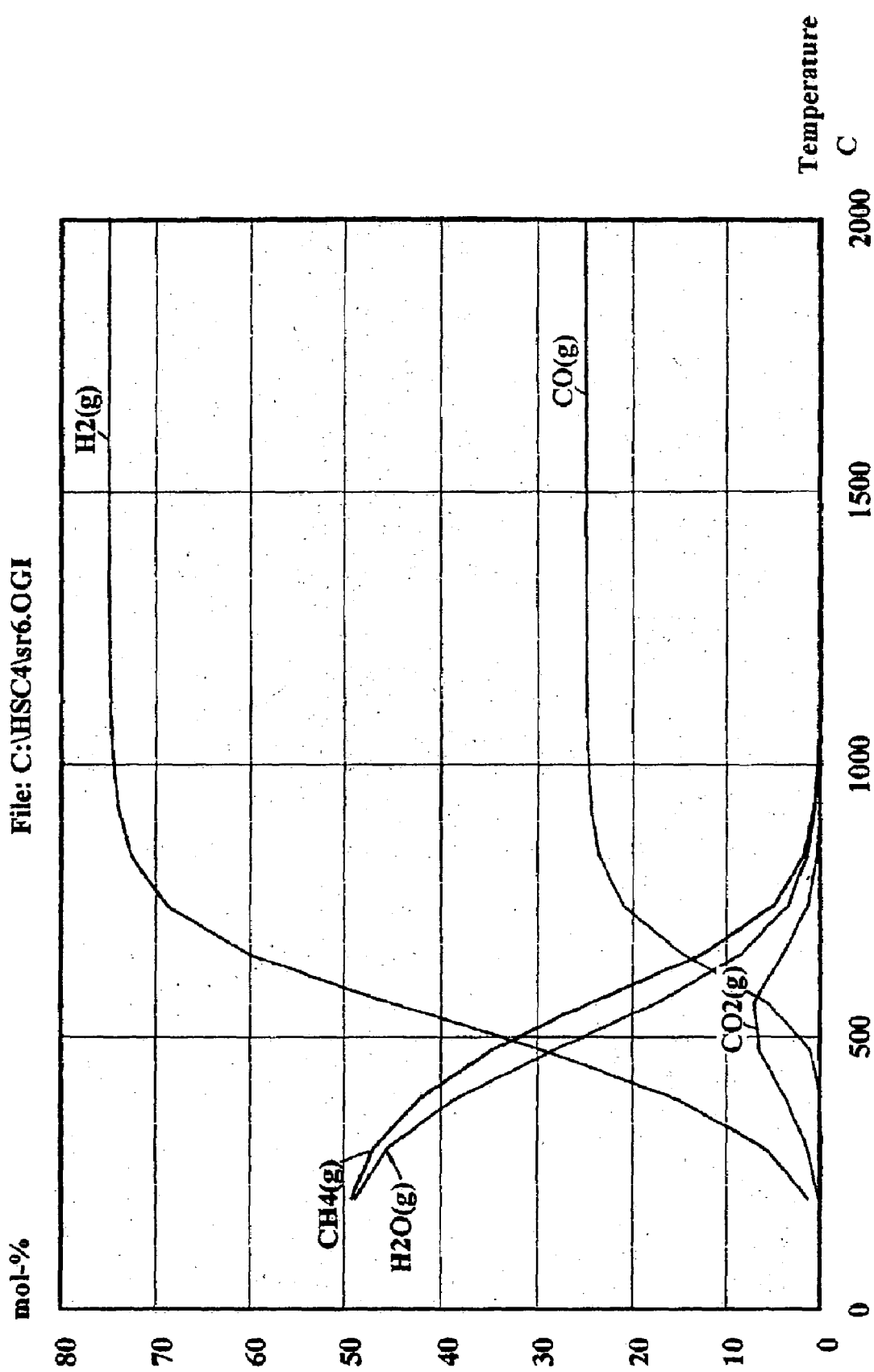
FIG. 2 is a plot of the commercial steam reforming of methane to make syngas consisting of hydrogen and carbon monoxide.

FIG. 2 is a plot of the commercial steam reforming of methane that is a well known commercial process and is the principal process for manufacturing hydrogen gas in refineries for use in petroleum hydro-cracking and hydro-reforming process steps as well as manufacturing hydrogen gas as a commodity sold in the marketplace. Standard nickel catalysts are used for this conversion in order to lower the reactor tube temperatures so that less expensive alloys can be used and their process lifetime extended.

The plots shown in FIGS. 2–10 are based on calculations performed byte method of the Gibbs Free Energy Minimization to yield gas compositions at thermodynamic equilibrium from the lowest temperature of 200° C. up to 2000° C.

The chemistry is started by placing methane ($CH_4$) and steam ($H_2O$) at one atmosphere in the gaseous state (subscript, g) in a vessel at 200° C. After waiting a sufficient amount of time, the compounds react slightly and form a small quantity of hydrogen ($H_2$) and carbon dioxide ($CO_2$) as shown in FIG. 2. This composition of the gas mixture is that which occurs if the chemical kinetics were fast enough to allow the reaction to reach completion in the time allotted. The following two reactions are occurring simultaneously:

$$CH_4 + 2H_2O \rightarrow 4H_2 + CO_2 \qquad (1)$$

$$H_2 + CO_2 \leftrightarrows H_2O + CO \qquad (2)$$

As soon as the $H_2 + CO_2$ are formed in reaction (1), the "Water gas shift reaction" forms $H_2O$ and CO by reaction (2).

In this way, reactions (1) and (2) interact according to each of their free energy driving forces to arrive at an equilibrium balance, and the final compositions are shown in the FIG. 2 As the temperature is raised the equilibrium shifts to forming $H_2$ and CO.

Practically speaking; however, commercially one cannot wait long periods of time for the slow chemical kinetics at 200° C. to reach the equilibrium composition. The gas composition curves are achieved more quickly with less residence time when active surface catalysts are used to impart extra energy into the gases to encourage them to react more quickly. As the temperature is increased, the kinetic velocities and energies are increased by the increased kinetic activities of the gases carrying more energy in their collisions and forming other compounds more quickly. Eventually, as the temperature is increased significantly to say 600° C., the kinetics become so fast that no active surface catalyst is needed. Thus, the gas compositions shown in FIG. 2 can be achieved at temperatures above about 600° C. without the use of catalysts since the approach to thermodynamic equilibrium can be achieved in reasonable residence times. To make commercial $H_2$, the commercial embodiment carries out the gas-phase chemistry inside of catalyst-coated tubes or tubes filled with catalyst-coated ceramic beads. These tubes are heated externally by means of very hot flue gas from a gas-fired furnace, sometimes using oxygen-enriched combustion air.

As the molecular complexity of the feed hydrocarbons increase, the temperatures have to be increased to levels well above 600° C. in order to approach their chemical thermodynamic equilibrium composition without the enhancing and accelerating effect of catalysts. In fact, it has been found based on experimental testing and the simulations performed pursuant to the present invention that above 700° C. is practically where catalysts are no longer needed when dealing with organic wastes.

Commercial gasification processes for coal, coke, petroleum, organic waste and similar feedstock also use catalytic fixed or preferably fluidized catalytic beds, such as the Texaco gasifier or the Shell gasification process as discussed in the '465 patent. These catalysts allow low enough temperatures that more cost-effective alloys can be used at high pressures for these commercial gasification vessels. Wastes, such as those contemplated as feedstocks for the process of the present invention, contain contaminates that are catalyst poisons. Therefore, extreme care must be taken in the acceptance of such a broad classes of wastes. The '465 patent discloses a preferred embodiment involving the use of a catalytic bed for gasifier 12 operating at temperatures in the range of about 400° to about 700° C. The wastes must be carefully selected so the catalysts are not easily poisoned when wastes are used as feedstock and have halogen and heavy metal contaminates.

Figure 3:
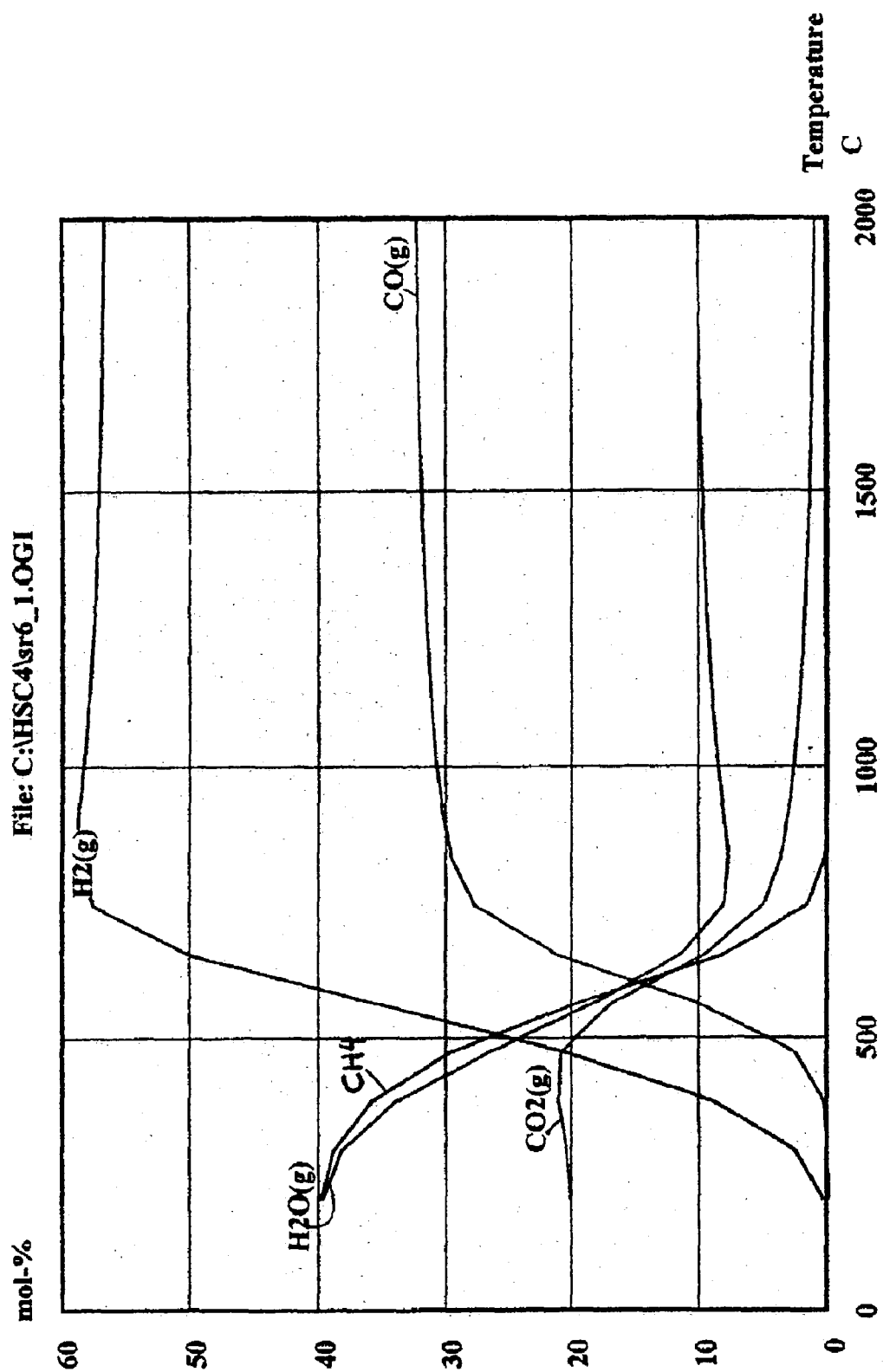
FIG. 3 shows a plot of the steam reforming of a mixture methane and fuel cell produced carbon dioxide at about 20% in the feed.

Now introducing fuel cells into the process, FIG. 3 shows the steam reforming of a mixture of methane and fuel cell-produced carbon dioxide added into the feed at about 20%. In accordance to the teaching of the '465 patent, the gasifier preferably uses a catalytic bed to form syngas. It has been found at high temperatures over 700° C., the syngas compositions shown are achieved without the need for catalysts. Comparing FIG. 2 and FIG. 3 beyond 800° C., it is noted that the hydrogen content is slightly lowered by the presence of increased carbon monoxide and water that is formed and by the residual carbon dioxide, since all three act as significant diluents in the formed syngas product, diluting the hydrogen. In fact, the carbon dioxide has no positive effect in the reaction, other than that it is consumed so that it is not released to the environment.

Figure 4:
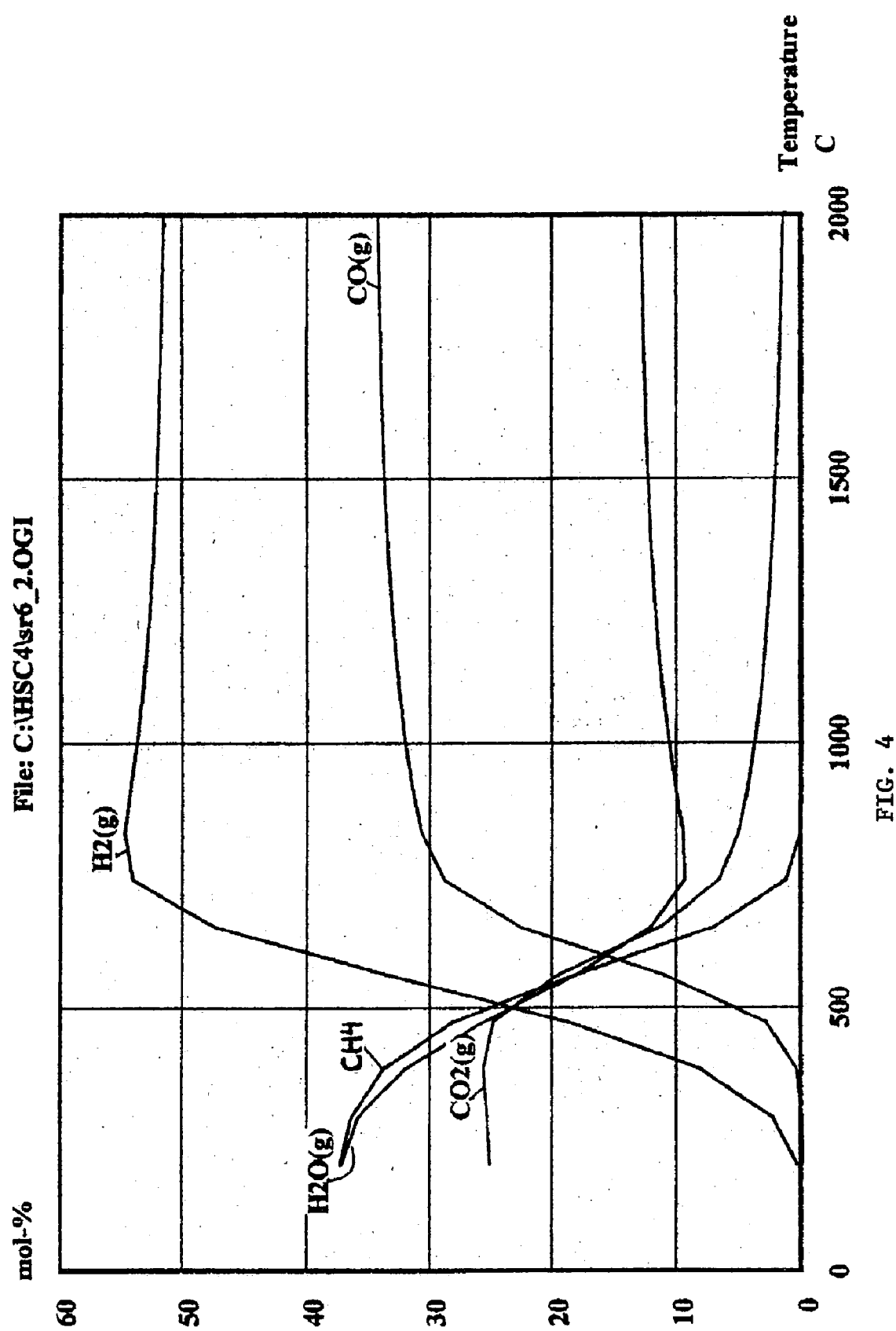
FIG. 4 shows a plot of the steam reforming of a mixture methane and fuel cell produced carbon dioxide at 25% in the feed.
Figure 5:
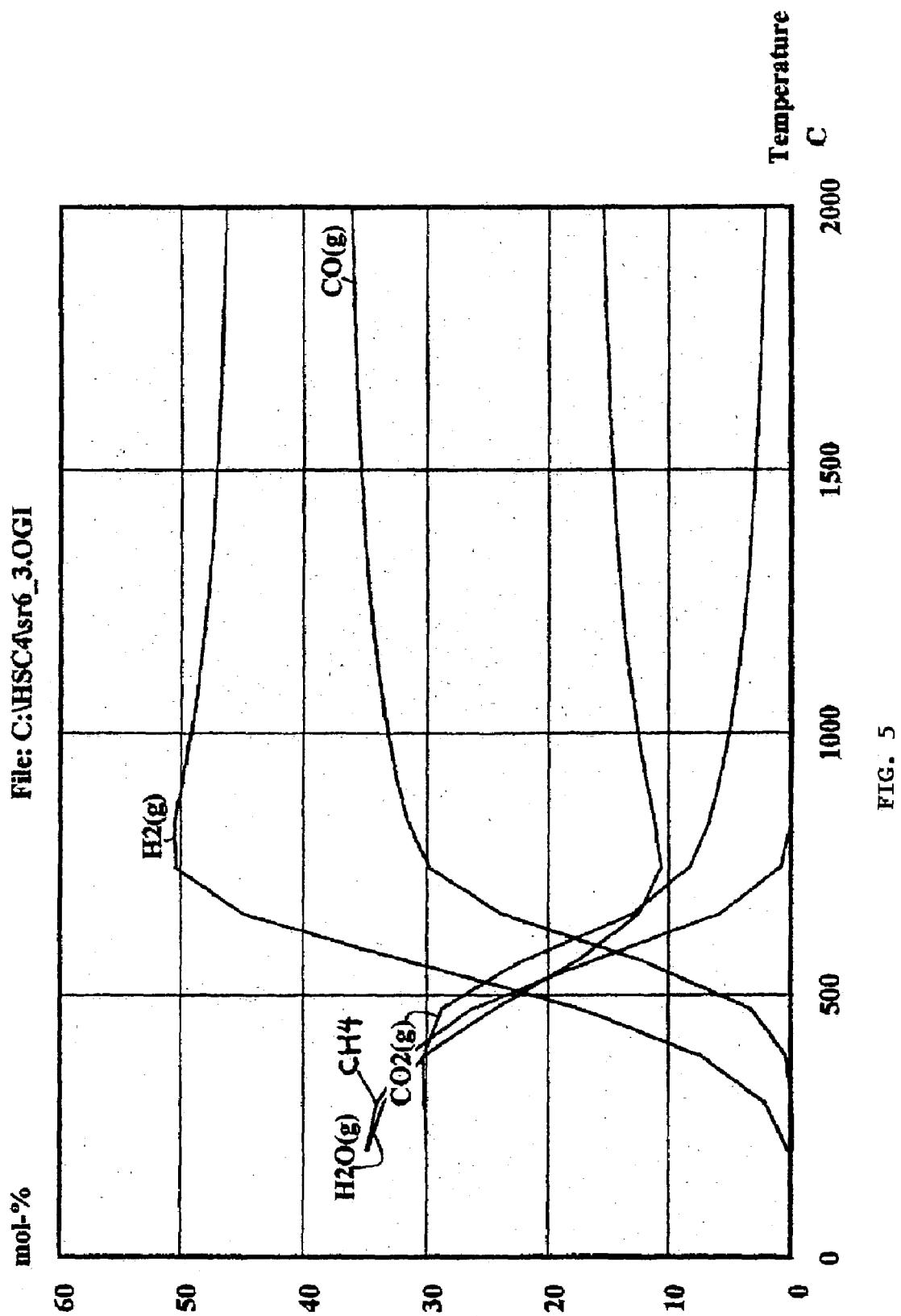
FIG. 5 shows a plot of the steam reforming methane and fuel cell produced carbon dioxide at 30% in the feed.

These effects are even more exaggerated as shown in FIGS. 4–5 at carbon dioxide concentrations of 25% and 30%, respectively. In the latter case shown in FIG. 5, the hydrogen concentration is dropped down to 46.5% from the higher hydrogen of 58% with carbon dioxide increased to 30% in the feed. But most importantly, in all these cases with increased carbon dioxide, the hydrogen is found to drop gradually with increasing temperatures over 800° C. where the thermodynamic equilibrium is achieved without the use of a catalyst.

Figure 6:
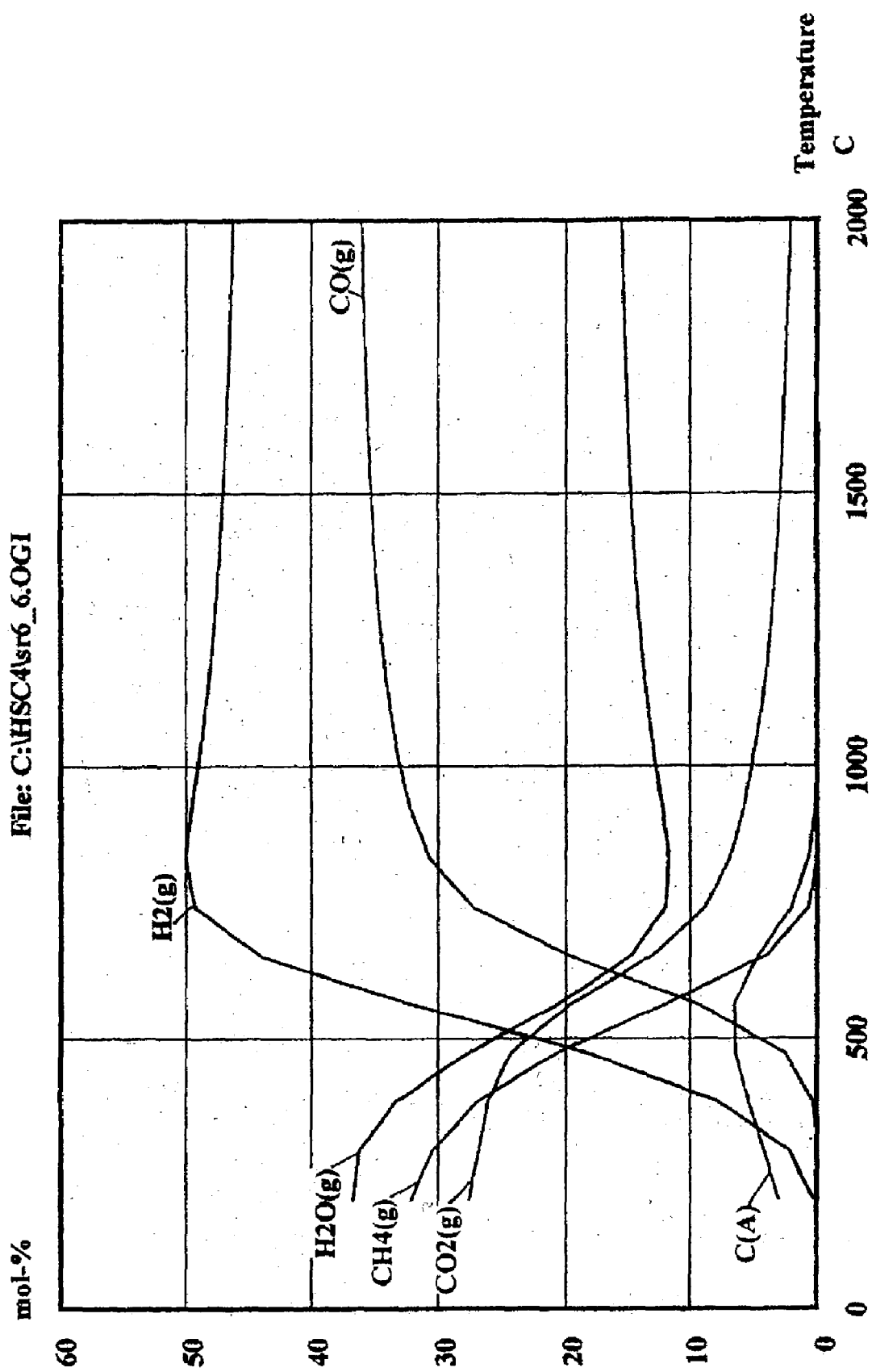
FIG. 6 shows a plot of the steam reforming methane and fuel cell produced carbon dioxide at 27.6% in the feed with elevated steam at 36.7%.

Increasing the fraction of steam in the feed, as shown in FIG. 6, does not correct this problem, as one of ordinary skill in the art would have thought. This situation, under conventional wisdom, dictated that with the use of lower temperature aided by the use of catalysts, the catalysts were strongly preferred to maximize the hydrogen product concentration desired. This was the dilemma faced by the inventor of the '465 patent.

Unexpectedly, a much-preferred solution has now been discovered to optimize this fuel cell link that has been overlooked and not exploited previously. It involves using elevated steam feed and $CO_2$ simultaneously with complex waste streams that have higher carbon/hydrogen ratios than simpler compounds such as methane. This approach appears to be contrary to conventional wisdom and practice, which suggests that to achieve high hydrogen concentrations at high temperature, the worst option is to increase the carbon content of the feed. However, for carbon dioxide this simplistic logic has been found to be very wrong.

The very simplified chemical reaction with the waste stream is fairly characterized entirely by carbon as in the following reaction:

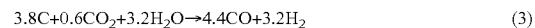
$$3.8C + 0.6CO_2 + 3.2H_2O \rightarrow 4.4CO + 3.2H_2 \qquad (3)$$

Reaction (3) is already 42.1% by volume hydrogen (i.e. mole percent), which is comparable to the hydrogen levels in FIGS. 3–6. Therein, one would have expected about 46% by volume $H_2$. Reaction (3) stoichiometry is the rough optimum, maximizing hydrogen content Varying the stoichiometric quantifies of the reactants produces less than optimum hydrogen. It is noteworthy that the addition of $CO_2$ to the feed can reduce the requirements for steam below stoichiometric requirements. In fact, there is an optimum combination of using both $CO_2$ and steam.

A generalized chemical reaction can be written for any carbonaceous feedstock, as expressed by the generalized empirical formula $C_aH_bO_c$:

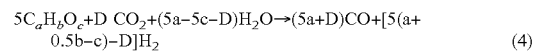
$$5C_aH_bO_c + D\,CO_2 + (5a - 5c - D)H_2O \rightarrow (5a + D)CO + [5(a + 0.5b - c) - D]H_2 \qquad (4)$$

The H$_2$/CO ratio can be optimized by the right combination of CO$_2$ and H$_2$O for a given waste feed mixture characterized by the empirical formula, C$_a$H$_b$O$_c$. It is noted that the amount of H$_2$O needed is reduced below its stoichiometric requirements (5a–5c) for conventional steam reforming by the "D" amount of CO$_2$ used, since the stoichiometric coefficient on H$_2$O is (5a–5c–D).

Also, to help to adjust the H$_2$/CO ratio needed for Fischer-Tropsch synthesis of useful chemical co-products to sequester the carbon and avoid greenhouse gas emissions, examining this H$_2$/CO ratio is helpful, since it is expressed as:

$$\frac{H_2}{CO} = \frac{5(a + 0.5b + c) - D}{5a + D}$$

One notes for a given carbonaceous feedstock with the empirical formula, C$_a$H$_b$O$_c$, one can adjust the amount of CO$_2$, "D", to satisfy the Fischer-Tropsch synthesis requirements for the products desired.

To achieve higher hydrogen concentrations at high temperature to drive the fuel cells, increased feedstock hydrogen content together wit an excess steam below stoichiometric levels, (5a–5c–D), is allowed and is combined with the recycled fuel cell carbon dioxide, D. As shown in FIG.7–10, this provides the chemistry at thermodynamic equilibrium that achieves a high hydrogen-rich syngas that remains high and steady in hydrogen over a broad high temperature range up to and beyond 1300° C. without catalysts.

Figure 7:
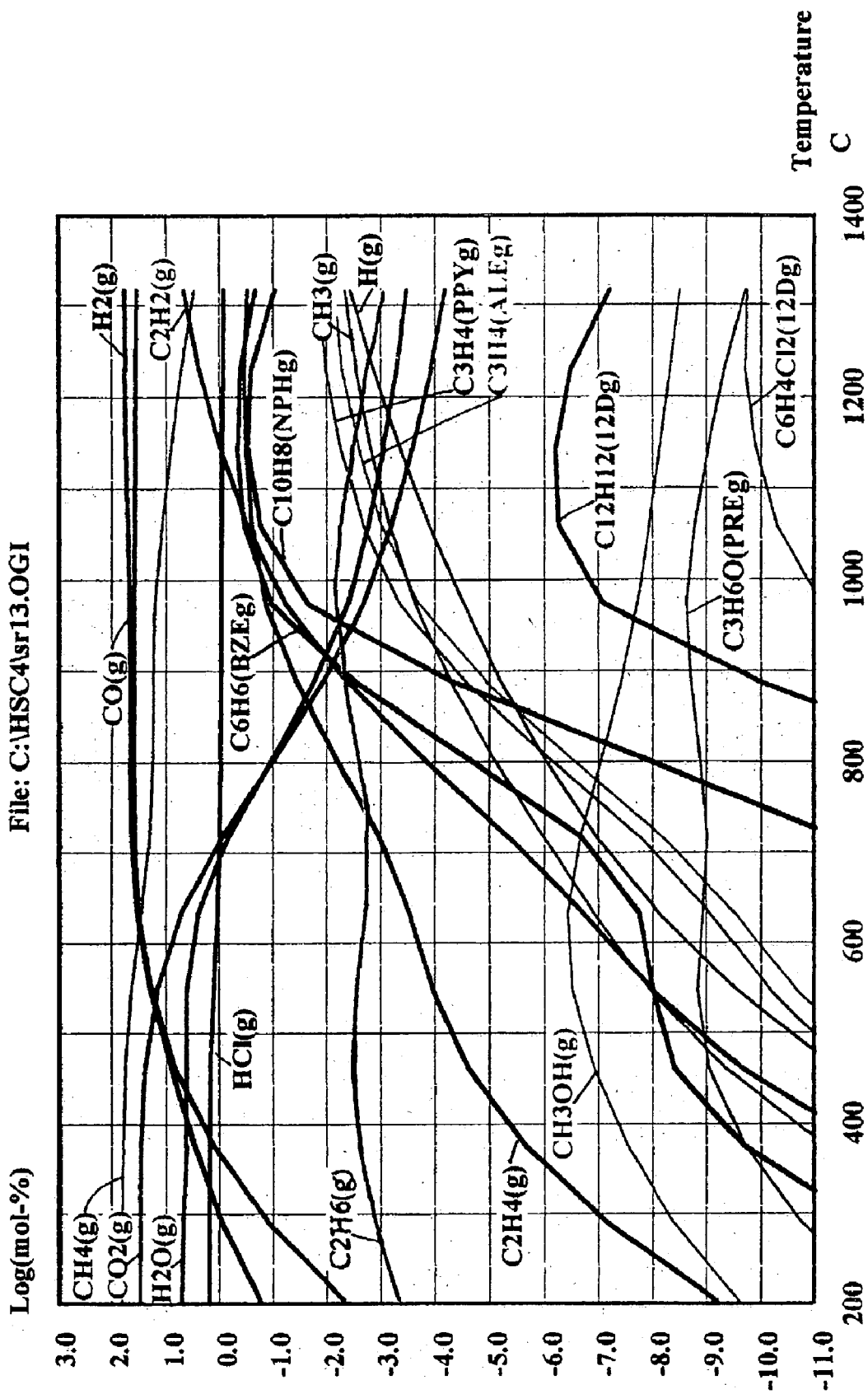
FIG. 7 shows a plot of the steam reforming of a mixture of a typical industrial waste, but without fuel cell produced carbon dioxide added in the feed, with stoichiometric steam at 49.45%.

FIG. 7 shows a plot of the steam reforming of a mixture of a typical industrial solvent waste (acetone, formaldehyde, methanol, dimethylbenzene, butanol, trichlor, and perchlor), without fuel cell produced carbon dioxide added in the feed, but with steam at 49.45%. As before, there are no kinetic limitations in compositions above 700° C. and the gas compositions are very accurate, and this fact has been confirmed by on-line gas chromatography and mass spectrometry. The H$_2$/CO was about 1.4. One notes that the hydrogen product remains high and steady at 48.9% at 700° C. and beyond. However, the syngas is quite dirty; with many undesirable compounds at the 0.5 mole percent level (i.e. carcinogenic benzene). This syngas is not acceptable for molten carbonate or solid oxide fuel cells even after the hydrogen chloride (and any other acid gases) are removed.

Referring to FIG. 7 at 1200° C., the syngas product composition starts at the highest with hydrogen, at 48.9%; then carbon monoxide at 35.5%; methane at 6.3%; acetylene (C$_2$H$_2$) at 2%; hydrogen chloride gas at 0.9%; benzene (C$_6$H$_6$) at 0.5%; ethylene (C$_2$H$_4$) at 0.4%; naphthalene at 0.28%; propylene-1(C$_6$H$_4$) at 85 ppm; propylene-2 (C$_3$H$_4$) at 50 ppm; ethane (C$_2$H$_6$) at 25 ppm; methyl radical (CH$_3$) at 25 ppm; hydrogen radical at 9 ppm; water at 7 ppm; carbon dioxide at 2 ppm; with all other compounds at levels below 0.01 ppm.

Figure 8:
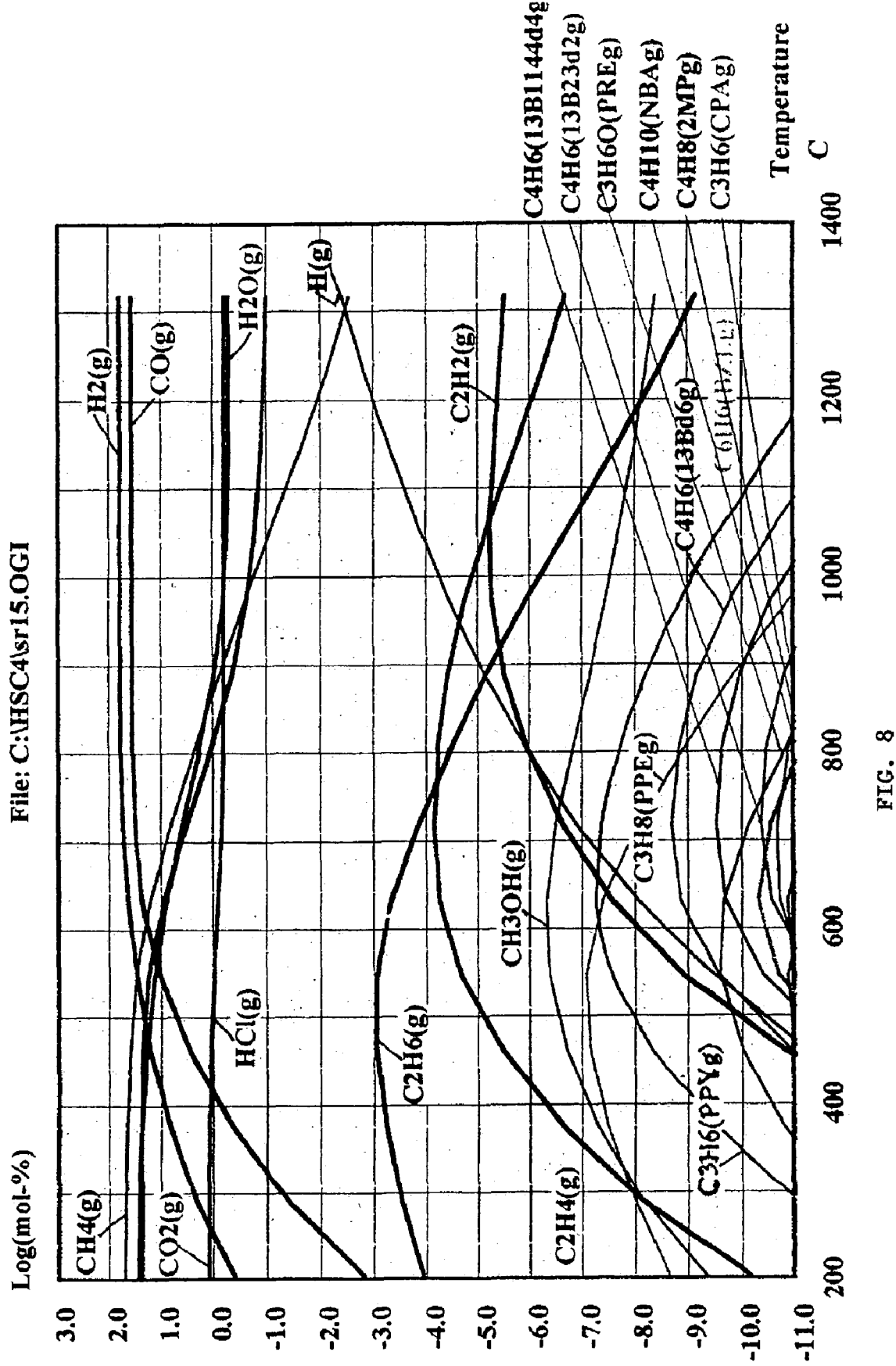
FIG. 8 shows a plot of the steam reforming of a mixture of a typical industrial waste, but without fuel cell produced carbon dioxide added in the feed, with super-stoichiometric steam at 66%.

FIG. 8 shows a plot of the steam reforming of the same mixture of industrial solvent waste as in the composition for FIG. 7, without fuel cell produced carbon dioxide added in the feed, but with steam at 66%. It is noted that the hydrogen product remains high and steady at 48.9% at 1000° C. and beyond. The syngas is quite clean, with undesirable compounds at the 10$^{-5}$ mole percent level (i.e. 0.1 ppm). This syngas ratio H$_2$/CO of about 1.2 is excellent for Fischer Tropsch synthesis as well as molten carbonate or solid oxide fuel cells, after the hydrogen chloride (and any other acid gases) are removed.

Referring to FIG. 8 at 1200° C., the syngas product composition starts at the highest with hydrogen, at 63%; then carbon monoxide at 40%; hydrogen chloride gas at 0.6% ppm; water at 0.5%; carbon dioxide at 0.1%; methane at 100 ppm; hydrogen radical at 10 ppm; acetylene at 4 ppm; ethylene at 1 ppm; with all other compounds at levels below 0.09 ppb. It is noted that this is only about 10,000 times cleaner in minor contaminants where the goal of the present invention is a million times cleaner.

Figure 9:
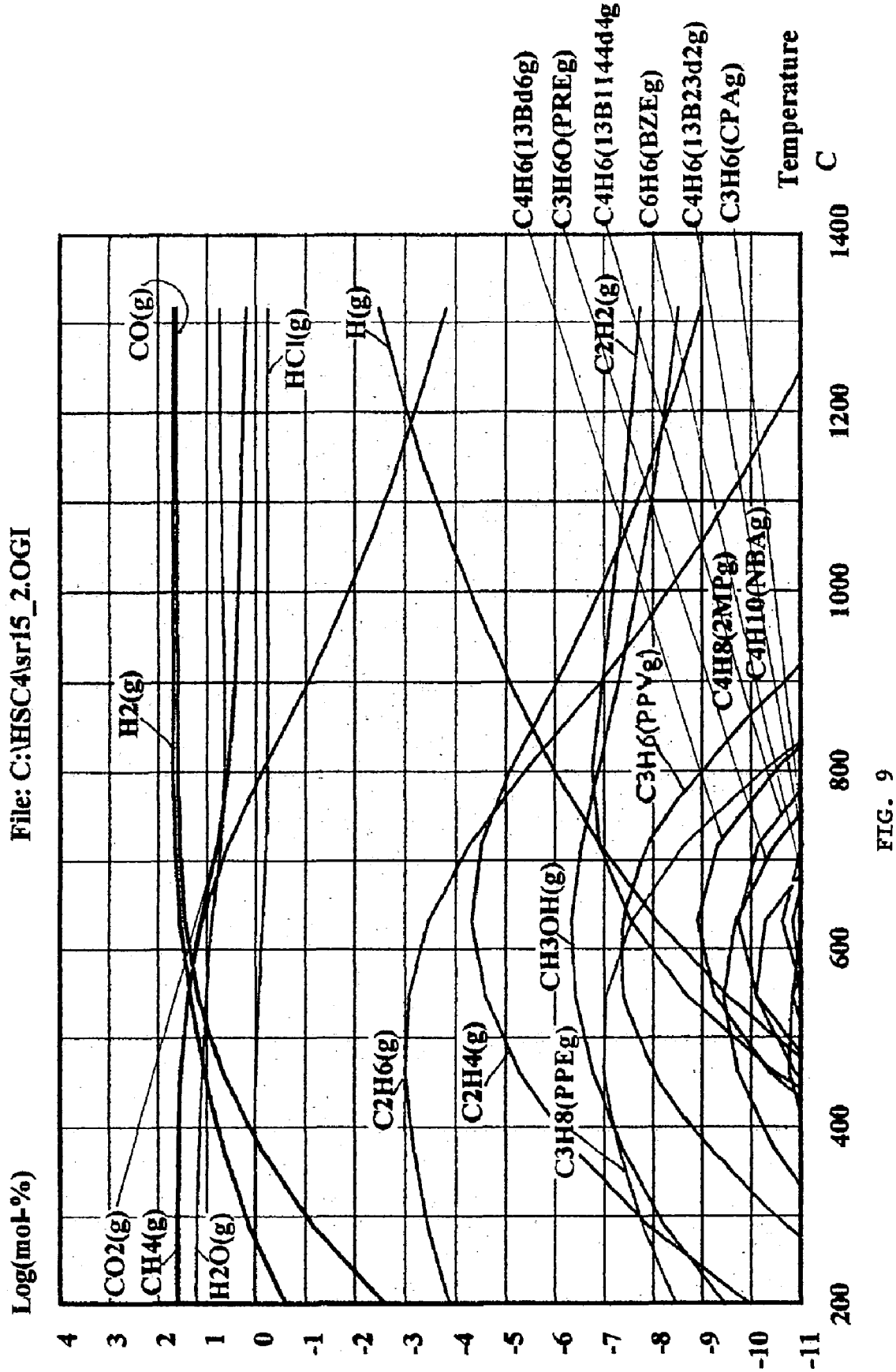
FIGS. 9–10 show plots of the steam reforming of a mixture of a typical industrial waste and fuel cell produced carbon dioxide at least about 20% added in the feed with sub-stoichiometic steam at 46–51% achieving high hydrogen and the cleanest syngas in accordance with the preferred embodiment of to present invention.

Even further improvements can be made, unexpectedly, as are shown in FIG. 9, by increasing the CO$_2$/H$_2$O ratio from the 1.3 in FIG. 7 up to 2.8 in FIG. 9. This added CO$_2$ from the fuel cell is 25% of the waste feed. The steam used in FIG. 8 is actually a decrease to 60% in the amount of steam consumption in the process, with the advantage of the steam-reforming reactor being able to accept more CO$_2$, contrary to conventional thinking.

Referring to FIG. 9 at 1200° C., the syngas product composition starts at the highest with hydrogen, at 49.9%; then carbon monoxide at 42.4%; water at 5.4%; CO$_2$ at 1.73%; hydrogen chloride gas at 0.6% ppm; hydrogen radical at 13 ppm; methane at 1.6 ppm; acetylene at 0.2 ppb; ethylene at 0.03 ppb; with all other compounds at levels below 0.1 ppb. It is noted that this is about 10 million times cleaner or lower in minor contaminants.

Even further improvements can be made, unexpectedly, as arc shown in FIG. 9, by increasing the CO$_2$/H$_2$O ratio from the about 1.0 in FIG. 8 up to 2.8 in FIG. 9. This added CO$_2$ from the fuel cell is 25% of the waste feed. The steam used in FIG. 8 is actually a decrease to 60% in the amount of steam consumption in the process, with the advantage of the steam-reforming reactor being able to accept more CO$_2$, contrary to conventional thinking.

Figure 10:
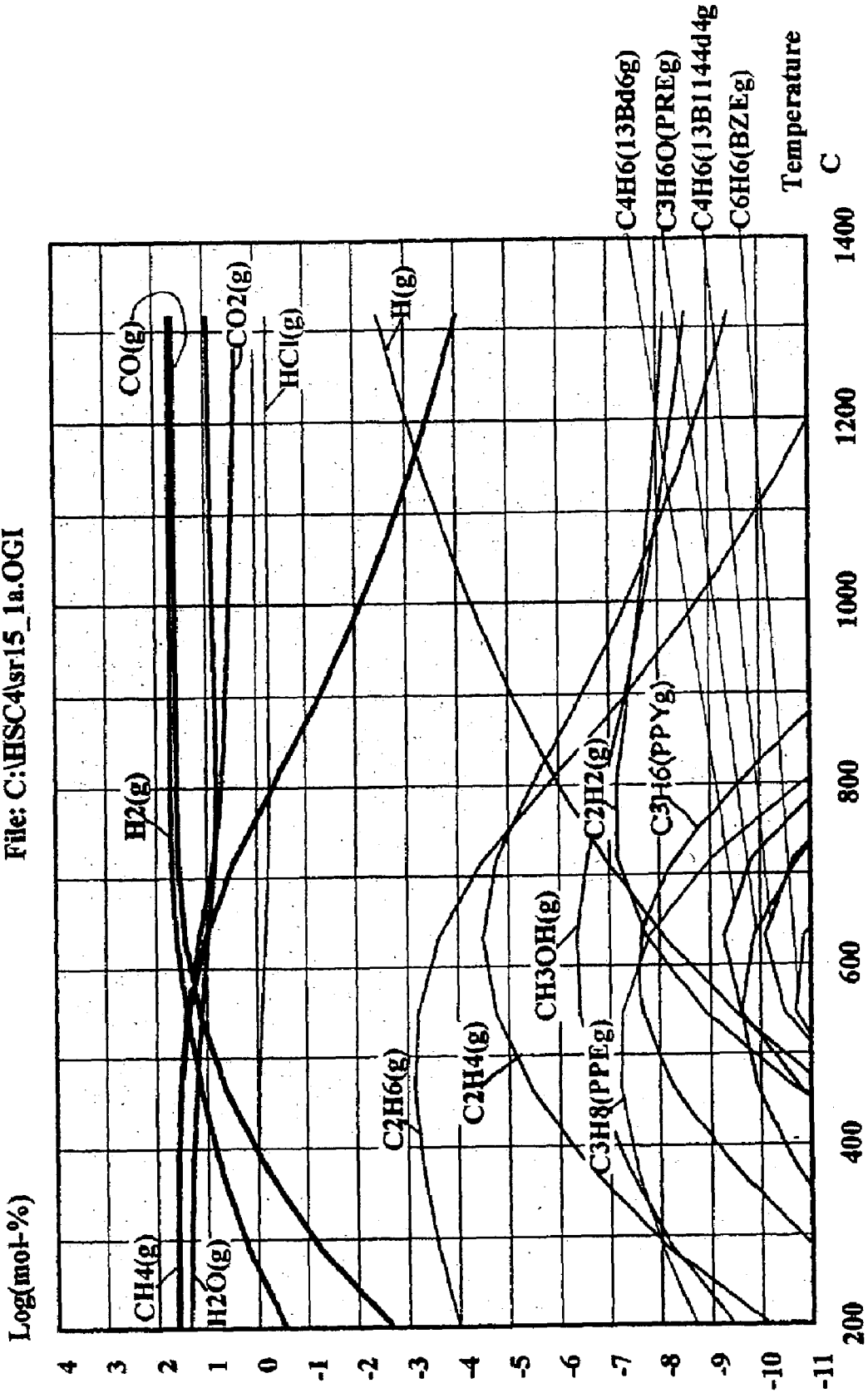

Referring to FIG. 10 at 1200° C., the syngas product composition starts at the highest with hydrogen at 48.9%, then carbon monoxide at 40.0%; water at 8.1%; CO$_2$ at 2.5%; hydrogen chloride gas at 0.6% ppm; hydrogen radical at 13 ppm; methane at 2.5 ppm; acetylene at 0.1 ppb; ethylene at 0.01 ppb; with all other compounds at levels below 0.04 ppb. It is noted that this is about 20 million times cleaner or lower in minor contaminants.

Both of these improvements shown in FIGS. 9 and 10 are economically attractive commercially. This yields a H$_2$/CO about 1.2 that is a syngas composition more amenable to making more valuable chemical co-products than methanol (selling only @ 50¢/lb), for example, that requires a H$_2$/CO of 2.0 for its synthesis. Thus, the addition of shift reactors to adjust the H$_2$/CO upward or downward are not required—a further economic advantage of this process of the present invention.

Figure 11:
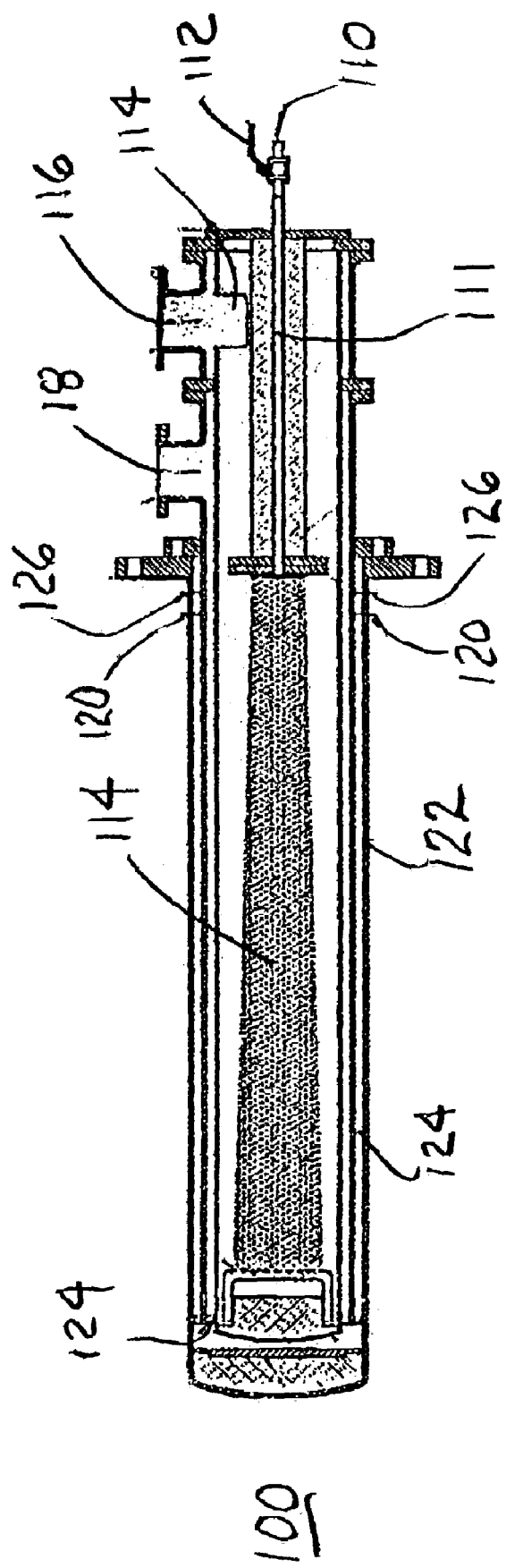
FIG. 11 show a cross-sectional view of a superheater.

Referring to FIG. 11, a superheater 100 is shown in which a mixture of air and natural gas or other suitable fuel is fed through inlet 110 in gas feed tube 111 after fuel-air supply valve 112 is in the open position to supply matrix burner 114. A suitable matrix burner is described in U.S. Pat. No. 6,065,963, the description of which is incorporated herein by reference. Matrix or conical surface burners of the type suitable for use in the superheater of the present invention are manufactured by N.V. Acotech S.A and Hauck Manufacturing Company. The flue gases from matrix burner 114 are removed from superheater 100 via flue 114 in tube 116. Process gases from gasifier 12 enter through a plurality of process gas inlets 120 supplied by an annular manifold (not shown) around the circumference of the walls 122 of superheater 100 and pass into flow annulus 124. Similarly, steam is introduced through line 150 (see FIG. 12) operably connected to a plurality of steam inlets 126 supplied by an annular manifold into annulus 124. The heated exit gases pass through exit gas outlet 18.

Figure 12:
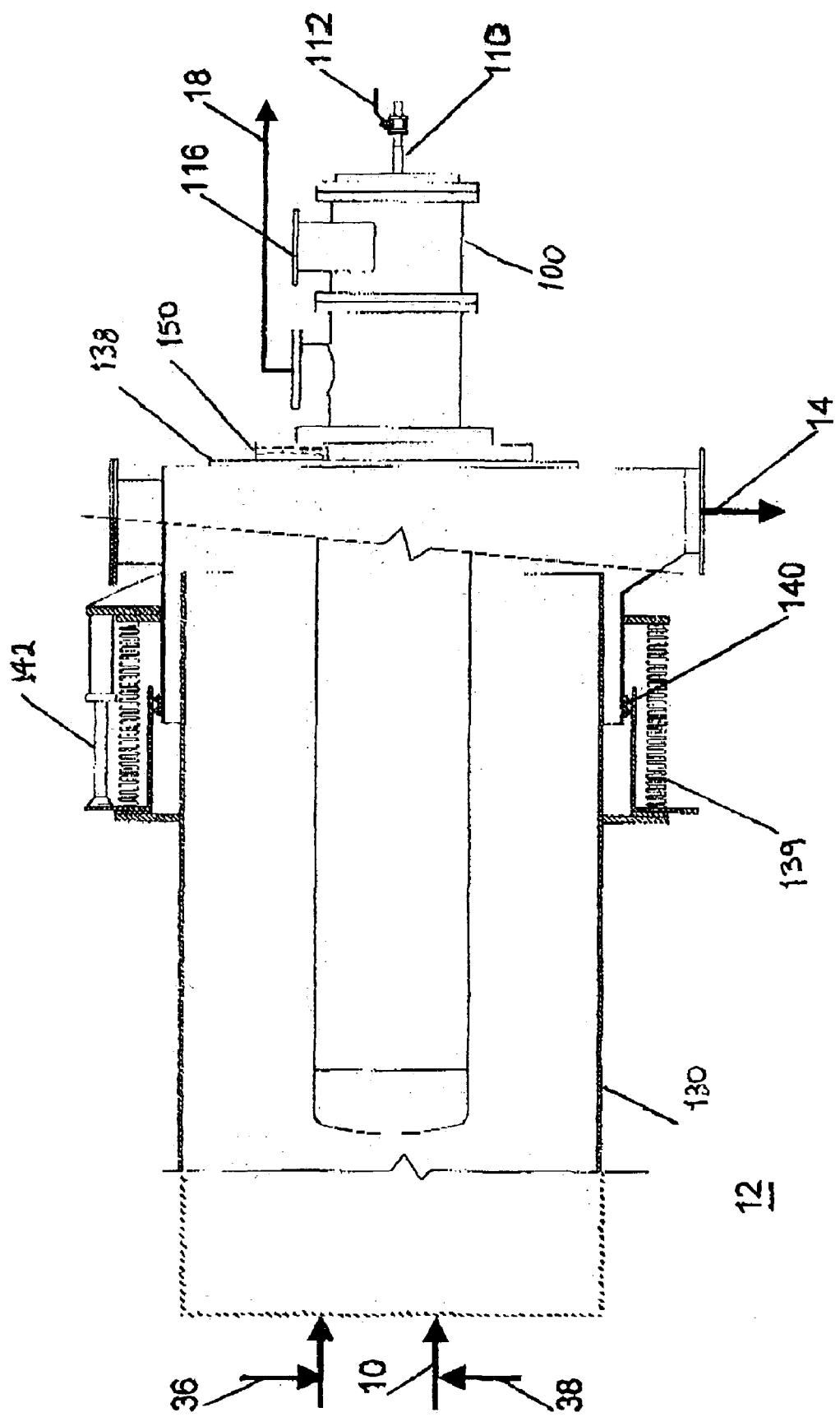
FIG. 12 is a schematic diagram of a preferred gasifier as shown in FIG. 1 in which a rotary kiln is combined with a superheater shown in FIG. 11 so that the superheater is positioned within the exit region of the kiln in order to elevate the gas temperature and enrich the syngas exiting the kiln.

Although FIG. 12 shows gasifier 12 comprising rotary kiln 130 and superheater 100 positioned partially within the exit region 138 of kiln 130, superheater 100 can also be operably positioned entirely outside of kiln 130 in order to superheat the intermediate gas stream from the kiln that enter the process gas inlet 120 (see FIG. 11) of superheater 100 to temperatures in the range at least 700° to about 1600° C. (1300–2900° F.) before the exit gas stream passes through exit gas outlet 18. A standard expansion bellows 139, a rotary seal assembly 140, and a plurality of pneumatic struts 142 are operably mounted around the outside circumference of kiln 130 to allow for approximately one foot of expansion of kiln 130 during its operation.

Further, without departing from the spirit and scope of this invention, one of ordinary skill in the art can make various other embodiments and aspects of the process and system of the present invention to adapt it to specific usages and conditions. As such, these changes and modifications are properly, equitably, and intended to be, within the full range of equivalents of the following claims.

What is claimed is:

1. A process for converting carbonaceous feedstocks into energy without the production of unwanted greenhouse gas emissions comprising:
   (a) converting a carbonaceous feedstock selected from the group consisting of coal, hydrocarbon oil, natural gas, petroleum coke, oil shale, carbonaceous-containing waste oil, carbonaceous-containing medical waste, carbonaceous-containing hazardous waste, other carbonaceous-containing waste, and mixtures thereof and a greenhouse gas stream in a gasification unit to synthesis gas comprising carbon monoxide and hydrogen, said gasification unit is a non-catalytic high temperature, gas-phase reactor operating at conditions to achieve a gas exit temperature of from at least 700° to about 1600° C. (1300–2900° F.);
   (b) electrochemically oxidizing at least a portion of said synthesis gas from said gasification unit in a first half-cell of a fuel cell (anode) to a first half-cell exit gas comprising carbon dioxide and water;
   (c) recovering the carbon dioxide from said first half-cell exit gas to serve as at least 20% of said greenhouse gas stream in step (a); and
   (d) electrochemically reducing an oxygen-containing gas in a second half-cell of said fuel cell (cathode) completing the circuit and resulting in the production of electrical energy.

2. The process of claim 1 wherein said greenhouse gas stream is carbon dioxide.

3. The process of claim 1 is used as in electric power producing fossil fuel plant.

4. The process of claim 1 is used in a petroleum refinery.

5. The process of claim 1 is used in a petrochemical plant.

6. The process of claim 1 wherein said gasification unit contains a rotary kiln.

7. The process of claim 1 wherein a portion of said synthesis gas from said gasification unit is converted in a chemical reactor into useful hydrocarbon products.

8. The process of claim 7 wherein said chemical reactor is a Fischer-Tropsch reactor.

9. The process of claim 1 wherein a major portion of the water is condensed from said first half-cell exit gas using a condenser.

10. The process of claim 1 wherein the amount of greenhouse gas stream is adjusted in step (a) so that the combined carbonaceous feedstock and greenhouse gas stream to said gasification unit has a hydrogen to carbon monoxide ratio in the range of about 1.2 to about 1.75.

11. The process of claim 1 wherein the oxygen-containing gas in step (d) is air and the nitrogen portion as a result of the electrical reduction is exited into the atmosphere.

12. The process of claim 1 wherein said first half-cell of said fuel cell contains an electrolyte surrounding a porous catalytic anode electrode.

13. The process of claim 12 wherein said second half-cell of said fuel cell contains an electronically conducting electrolyte surrounding a catalytic cathode electrode.

14. The process of claim 13 wherein said first and second half-cells of said fuel cell are separated by an ionically conducting membrane that will not allow passage of components from the respective half-cells.

15. A system for converting carbonaceous feedstocks into energy without the production of unwanted greenhouse gas emissions which comprises:
   (a) a gasification unit containing a non-catalytic high temperature, gas-phase reactor and having inlet means for a carbonaceous feedstock selected from the group consisting of coal, hydrocarbon oil, natural gas, petroleum coke, oil shale, carbonaceous-containing waste oil, carbonaceous-containing medical waste, carbonaceous-containing hazardous waste other carbonaceous-containing waste, and mixtures thereof and a greenhouse gas stream operating at conditions to achieve a gas exit temperature of from at least 700° to about 1600° C. (1300–2900° F.) for converting a combined feedstock into synthesis gas comprising carbon monoxide and hydrogen and an outlet for the synthesis gas;
   (b) a fuel cell for the production of electrical energy comprising a first half-cell having an inlet in fluid communication with the synthesis gas and first means for electrochemically oxidizing synthesis gas into a first half-cell exit gas of carbon dioxide and water, a second half-cell having second means for electrochemically reducing an oxygen-containing gas, and a membrane separating said first and second half cells that will not allow passage of components from the respective half-cells; and
   (c) passage means for passing the carbon dioxide from said first half-cell to serve as a greenhouse gas stream for said gasification unit.

16. The system of claim 15 wherein the greenhouse gas stream is carbon dioxide.

17. The system of claim 15 wherein said gasification unit contains a rotary kiln.

18. The system of claim 15 further comprising a chemical reactor in fluid communication with said gasification unit to convert a portion of said synthesis gas from said gasification unit into useful hydrocarbon products.

19. The system of claim 18 wherein said chemical reactor is a Fischer-Tropsch reactor.

20. The system of claim 19 wherein a condenser is used to condense a major portion of the water from said first half-cell exit gas.

21. The system of claim 19 wherein the amount of greenhouse gas stream is adjusted in step (a) so that exit gas stream of said gasification unit has a hydrogen to carbon monoxide ratio in the range of about 1.2 to about 1.75.

22. The system of claim 15 wherein the oxygen-containing gas is air and the nitrogen formed as a result of the ionic reduction is exited into the atmosphere.

23. The system of claim 15 wherein said first half-cell of said fuel cell contains an electrolyte surrounding a porous catalytic anode electrode.

24. The system of claim 23 wherein said second half-cell of said fuel cell contains an electronically conducting electrolyte surrounding a catalytic cathode electrode.

25. A system for converting carbonaceous feedstocks into energy without the production of unwanted greenhouse gas emissions which comprises:
  (a) a gasification unit containing an indirectly heated rotary kiln and having inlet means for a carbonaceous feedstock selected from the group consisting of coal, hydrocarbon oil, natural gas, petroleum coke, oil shale, carbonaceous-containing waste oil, carbonaceous-containing medical waste, carbonaceous-containing hazardous waste, other carbonaceous-containing waste, and mixtures thereof and a greenhouse gas stream, a gas exit means, and a solids exit means between the inlet means and the exit means operating at conditions to achieve a gas exit temperature of from at least 700° to about 1600° C. (1300–2900° F.) for converting a converting the combined feedstock into synthesis gas comprising carbon monoxide and hydrogen and an outlet for the synthesis gas;
  (b) a fuel cell for the production of electrical energy comprising a first half-cell having an inlet in fluid communication with the synthesis gas and first means for electrochemically oxidizing synthesis gas into a first half-cell exit gas of carbon dioxide and water, a second half cell having second means for electrochemically reducing an oxygen-containing gas, and a membrane separating said first and second half cells that will not allow passage of components from the respective half-cells; and
  (c) passage means for passing the carbon dioxide from said first half-cell to serve as a greenhouse gas stream for said gasification unit.

26. The system of claim 25 wherein said gasification unit further comprising a superheater means for superheating the exit gas to a temperature in the range from at least 700° to about 1600° C. (1300°–2900°F.).

27. The system of claim 26 wherein said gasification unit comprises said indirectly heated rotary kiln having said inlet means for said carbonaceous feedstock, said gas exit means, and said solids exit means, and having said superheater operably positioned at least partially within said kiln in the region adjacent to the gas exit means.

* * * * *